(12) United States Patent
Barazowski (10) Patent No.: US 11,104,247 B2
(45) Date of Patent: Aug. 31, 2021

(54) DUAL BATTERY ELECTRIC VEHICLE CHARGING SYSTEM

(71) Applicant: Gregory Barazowski, Chicago, IL (US)

(72) Inventor: Gregory Barazowski, Chicago, IL (US)

( * ) Notice: Subject to any disclaimer, the term of this patent is extended or adjusted under 35 U.S.C. 154(b) by 116 days.

(21) Appl. No.: 16/218,850

(22) Filed: Dec. 13, 2018

(65) Prior Publication Data

US 2019/0202319 A1 Jul. 4, 2019

Related U.S. Application Data

(60) Provisional application No. 62/611,164, filed on Dec. 28, 2017.

(51) Int. Cl.
*B60L 58/19* (2019.01)
*B60L 50/64* (2019.01)
*B60L 53/18* (2019.01)
*H02J 7/14* (2006.01)

(52) U.S. Cl.
CPC .............. *B60L 58/19* (2019.02); *B60L 50/64* (2019.02); *B60L 53/18* (2019.02); *H02J 7/1423* (2013.01)

(58) Field of Classification Search
CPC .......... B60L 58/19; B60L 50/64; B60L 53/18; B60L 2250/16; B60L 2250/12; B60L 50/66; B60L 58/21; B60L 58/22; B60L 58/12; B60L 50/60; H02J 7/1423; Y02T 10/7072; Y02T 90/14; Y02T 10/70
See application file for complete search history.

(56) References Cited

U.S. PATENT DOCUMENTS

| | | | | |
|---|---|---|---|---|
| 4,588,167 A | * | 5/1986 | Finzel | B66D 1/00 254/346 |
| 6,571,542 B1 | * | 6/2003 | Fillman | B60L 58/18 56/10.6 |
| 7,933,695 B2 | * | 4/2011 | Yamaguchi | B60L 50/61 701/22 |
| 8,471,521 B2 | * | 6/2013 | Stewart | H01M 10/486 320/104 |
| 8,543,270 B2 | * | 9/2013 | Kelty | B60L 15/2045 701/22 |
| 8,639,406 B2 | * | 1/2014 | Avery | B60L 58/18 701/22 |

(Continued)

*Primary Examiner* — Stacy Whitmore
(74) *Attorney, Agent, or Firm* — Boudwin Intellectual Property; Daniel Boudwin (57) ABSTRACT

A dual battery electric vehicle charging system designed to operate over extended distances. The dual battery electric vehicle charging system includes a vehicle having a first battery and a second battery, each connected to an electric motor designed to power the vehicle and a charging system designed to charge each battery. A control panel is disposed within reach of the driver. A power switch on the control panel is connected to the electric motor, the first battery, and the second battery, and is designed to control which battery powers the electric motor. A charging switch on the control panel is connected to the charging system, the first battery, and the second battery, and is designed to control which battery the charging system recharges. Additionally, the charging switch includes a neutral setting wherein neither battery is selected. In this way, a user is able to operate a vehicle over extended distances.

18 Claims, 5 Drawing Sheets

(56) References Cited

U.S. PATENT DOCUMENTS

| | | | | |
|---|---|---|---|---|
| 8,643,336 B2* | 2/2014 | Reineccius | | H02J 4/00 320/128 |
| 8,971,057 B2* | 3/2015 | Smith | | H02J 7/00 363/15 |
| 9,037,334 B1* | 5/2015 | Cole | | B60W 10/06 701/22 |
| 9,136,712 B2* | 9/2015 | Reineccius | | H02J 4/00 |
| 9,393,921 B1* | 7/2016 | Weicker | | G01R 31/382 |
| 9,919,693 B2* | 3/2018 | Aldighieri | | B60T 1/10 |
| 9,960,458 B2* | 5/2018 | Weicker | | H01M 10/441 |
| 10,124,691 B1* | 11/2018 | Failing | | B60L 53/30 |
| 2009/0095115 A1* | 4/2009 | Lee | | B62K 3/005 74/496 |
| 2009/0107743 A1* | 4/2009 | Alston | | H02J 7/342 180/65.21 |
| 2010/0006351 A1 | 1/2010 | Howard | | |
| 2011/0271794 A1* | 11/2011 | Hinds | | B60K 6/48 74/665 F |
| 2012/0312122 A1* | 12/2012 | Miller | | B60W 20/10 74/664 |
| 2013/0119748 A1* | 5/2013 | Yamamoto | | B60K 17/046 301/6.5 |
| 2014/0200756 A1* | 7/2014 | Sisk | | B60L 11/1864 701/22 |
| 2014/0265554 A1* | 9/2014 | Yang | | B60L 7/12 307/9.1 |
| 2014/0358343 A1* | 12/2014 | Chastang, Jr. | | B60L 1/00 701/22 |
| 2015/0217641 A1* | 8/2015 | Slosarczyk | | B60L 50/60 701/22 |
| 2016/0001664 A1* | 1/2016 | Roth | | B60L 50/66 318/139 |
| 2016/0049655 A1* | 2/2016 | Fasching | | H01M 4/505 429/221 |
| 2016/0094056 A1* | 3/2016 | Dulle | | B60L 3/0046 320/126 |
| 2016/0137092 A1* | 5/2016 | Thieme | | B60W 10/06 307/10.6 |
| 2017/0050529 A1* | 2/2017 | Lambert | | H02J 7/0047 |
| 2017/0066342 A1* | 3/2017 | Butler | | F02N 11/14 |
| 2017/0106819 A1* | 4/2017 | Richardson | | B60R 16/033 |
| 2017/0133727 A1* | 5/2017 | Brockman | | B60R 16/033 |
| 2017/0182910 A1* | 6/2017 | Schmidt | | B60L 58/18 |
| 2018/0118036 A1* | 5/2018 | Francis | | B60L 50/50 |
| 2018/0131221 A1* | 5/2018 | Ambroziak | | B60L 8/003 |
| 2018/0191185 A1* | 7/2018 | Al Rasheed | | H02J 7/342 |
| 2018/0331544 A1* | 11/2018 | Dulle | | G01R 31/52 |
| 2018/0345778 A1* | 12/2018 | Yamanaka | | B60K 1/04 |
| 2019/0047437 A1* | 2/2019 | Lee | | B60L 50/51 |
| 2019/0092257 A1* | 3/2019 | Boecker | | H02J 7/34 |
| 2019/0100111 A1* | 4/2019 | Liu | | B60L 58/21 |
| 2019/0135112 A1* | 5/2019 | Johnson | | B60L 3/0046 |
| 2019/0137093 A1* | 5/2019 | Matte | | G01S 1/70 |
| 2019/0152342 A1* | 5/2019 | Shen | | H02J 7/0014 |
| 2019/0226859 A1* | 7/2019 | Li | | G01C 21/3469 |
| 2019/0375311 A1* | 12/2019 | Shen | | B60L 1/02 |
| 2020/0105073 A1* | 4/2020 | Kuroda | | B60K 6/28 |
| 2020/0130511 A1* | 4/2020 | Botts | | H02J 7/0042 |

* cited by examiner

DUAL BATTERY ELECTRIC VEHICLE CHARGING SYSTEM

CROSS REFERENCE TO RELATED APPLICATIONS

This application claims the benefit of U.S. Provisional Application No. 62/611,164 filed on Dec. 28, 2017. The above identified patent application is herein incorporated by reference in its entirety to provide continuity of disclosure.

BACKGROUND OF THE INVENTION

The present invention relates to batteries for electric vehicles. More specifically, the invention provides a first battery and a second battery in a vehicle, each operably connected to an electric motor and a charging system, wherein a power switch on a control panel selects which battery provides power to the vehicle and a charging switch on the control panel selects which battery is charged.

Many people drive their vehicles on a day to day basis. However, rising gas prices, as well as the pollution produced, can cause individuals to forgo using a traditional internal combustion engine. Although electric vehicles provide an alternate option, individuals may feel uncomfortable relying on a single battery when driving for extended distance. Thus, an improved dual battery electric vehicle charging system that can allow an electric vehicle to operate over greater distances is desired.

SUMMARY OF THE INVENTION

In view of the foregoing disadvantages inherent in the known types of batteries for electric vehicles now present in the known art, the present invention provides a dual battery electric vehicle charging system wherein the same can be utilized for providing convenience for the user when desiring to operate an electric vehicle over greater distances.

The present system comprises a dual battery electric vehicle charging system. The dual battery electric vehicle charging system comprises a vehicle having a first battery and a second battery disposed therein, each operably connected to an electric motor configured to power the vehicle. A charging system is additionally operably connected to both the first battery and the second battery and configured to provide power thereto. Further, a control panel is disposed within reach of the driver. A power switch disposed on the control panel is operably connected to the electric motor, the first battery, and the second battery, and is configured to selectively control which battery the electric motor draws power from. A charging switch disposed on the control panel is operably connected to the charging system, the first battery, and the second battery, and is configured to selectively control which battery draws power from the charging system. Additionally, the charging switch includes a neutral setting wherein neither battery is selected to charge. In this way, a user is able to operate a vehicle over extended distances.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. Like reference numerals are used throughout the drawings to depict like or similar elements of the portable bleacher seat. The figures are intended for representative purposes only and should not be considered to be limiting in any respect.

Figure 1A:
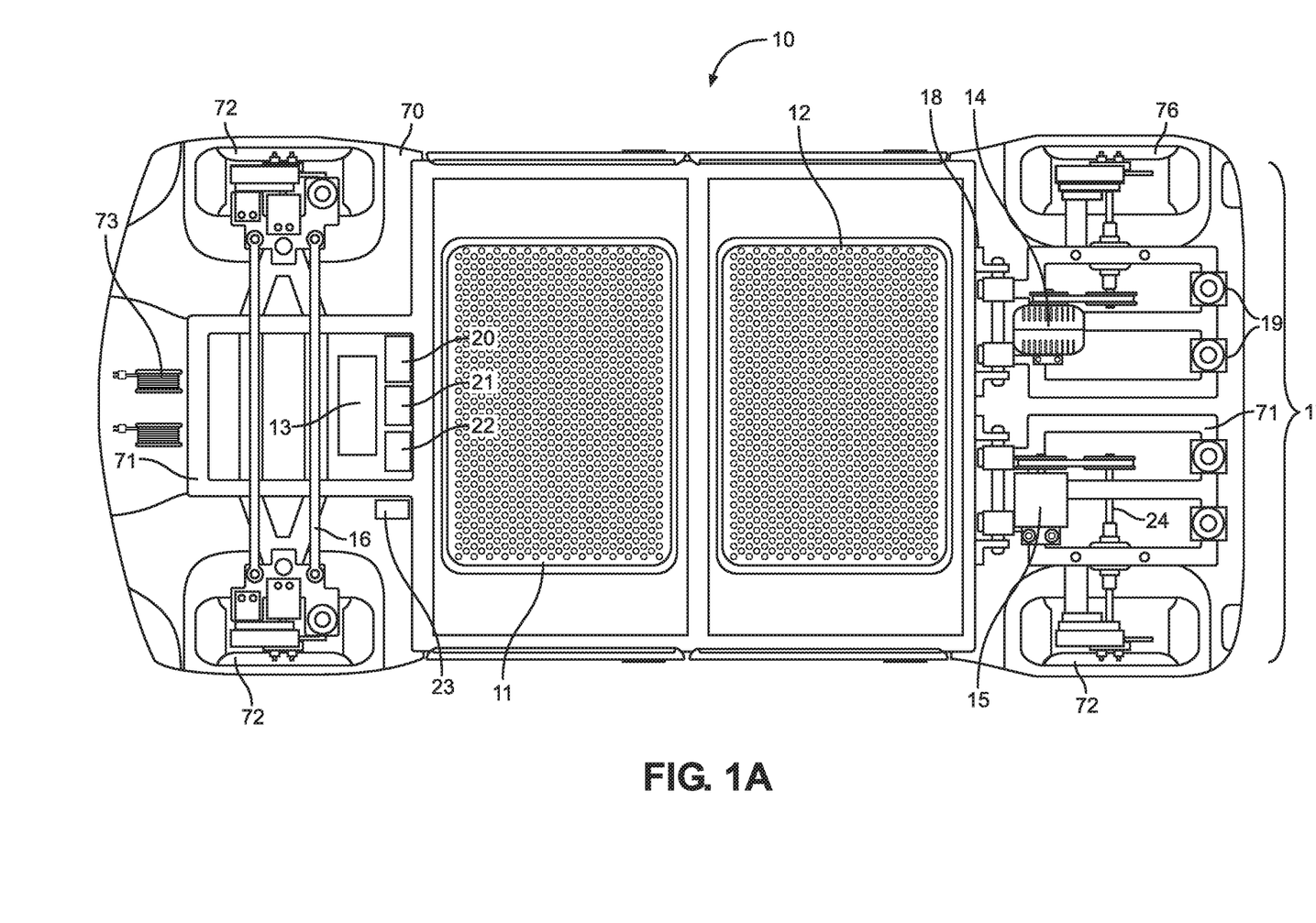
FIG. 1A shows a top cross-sectional view of an embodiment of the dual battery electric vehicle charging system.

Referring now to FIG. 1A, there is shown a top cross-sectional view of an embodiment of the dual battery electric vehicle charging system. A dual battery electric vehicle charging system 10 comprises a first battery 11 and a second battery 12, wherein either the first battery 11 or the second battery 12 is able to provide a total amount of energy necessary to power a vehicle 70 for an extended period of time. In the illustrated embodiment, both the first battery 11 and the second battery 12 are solid state batteries. In this way, both the first battery 11 and the second battery 12 can be charged faster and provide energy to the vehicle 70 for a greater period than a traditional battery would allow.

In the shown embodiment, both the first battery 11 and the second battery 12 are disposed within a frame 71 of the vehicle 70. In the illustrated embodiment, the frame 71 is separate from the body of the vehicle 70. However, in another embodiment, the frame 71 is a unibody, such that the body and frame 71 of the vehicle 70 are a single structure. In the shown embodiment, the first battery 11 and the second battery 12 are each disposed in a floorpan of the frame 71, such that each are centrally located to minimally impact weight distribution through the vehicle.

The dual battery electric vehicle charging system further comprises an electric motor 13, as is standard for an electric vehicle, wherein the electric motor 13 is configured to power the vehicle 70, thereby propelling the vehicle 70 in a desired direction. The electric motor 13 is operably connected to both the first battery 11 and the second battery 12, such that either battery 11, 12 is configured to provide power to the electric motor 13.

The vehicle 70 includes a pair of rear wheels 76 operably connected to a rear axle 24. In the shown embodiment, the pair of rear wheels 76 are free rolling, such that each rear wheel 76 is operably connected to their respective rear axle 24, as opposed to a single rear axle, wherein the rear axles 24 are non-powered and thus configured to rotate only when the vehicle 70 is already in motion.

The dual battery electric vehicle charging system further comprises a charging system 14. In the illustrated embodiment, the charging system 14 comprises an alternator operably connected to one of the rear axles 24 of the rear wheels 76. In this way, the rotational energy of the rear wheels 76 is converted to electric energy through the charging system 14. The charging system 14 is additionally operably connected to both the first battery 11 and the second battery 12, such that the energy produced by the rotation of the rear wheels 76 is stored within either battery 11, 12. In the illustrated embodiment, the alternator that comprises the charging system 14 is omni-directional, such that the alternator 14 is configured to rotate clockwise or counterclockwise. In this way, the alternator 14 produces a charge regardless of the direction the vehicle 70 is moving or which direction the rear wheels 76 rotate in.

A vehicle 70 utilizing the dual battery electric vehicle charging system 10 additionally comprises a rear frame 17 configured to aid the charging system 14 in providing power to the first battery 11 or the second battery 12. Thus, the rear frame 17 is securely affixed to the frame 71 through at least one hinged stabilizer 18. In this way, the hinged stabilizers 18 help keep the rear wheels 76 aligned with the vehicle 70 to provide lateral stability while the user is driving. In the illustrated embodiment, the rear frame 17 is separated into two parts, such that each rear wheel 76 has a rear frame 17.

Additionally, the rear frame 17 includes a pair of struts 19 disposed on opposite the hinged stabilizers 18 as a rear suspension system. In the illustrated embodiment, each rear wheel 76 includes a pair of struts 19 to provide the additional stabilization to the vehicle 70. The struts 19 are traditionally configured, such that each strut 19 is configured to compress along a vertical axis when pressure is applied, such that the strut 19 acts as a shock absorber for the vehicle 70 to aid when driving over road irregularities.

The rear frame 17 additionally comprises an air compressor 15, operably connected to the rear axle 24, such that the one rear wheel 76 which is not connected to the charging system 14 is operably connected to the air compressor 15. The air compressor 15 is similar to a standard issue air compressor in a traditional vehicle, such that the air compressor 15 is responsible for providing the vehicle with cool air while operational. In the shown embodiment, the air compressor 15 comprises a piston compressor. Further, in the illustrated embodiment the air compressor 15 is similarly disposed to the charging system 14, such that the air compressor 15 is also omni-directional and is configured to spin either clockwise or counterclockwise, depending on the type of vehicle 70.

The vehicle 70 includes a pair of front wheels 72 that are operably connected to a front axle 16, wherein the front axle 16 is operably connected to the electric motor 13, such that the front axle 16 rotates when power is provided thereto. A traditional voltage regulator 22 is additionally disposed within the front frame of the vehicle 70, wherein the voltage regulator 22 is configured to regulate the charging voltage produced by the charging system 14 to protect the remaining electrical components throughout the vehicle 70. Similarly, a traditional accelerometer 23 is additionally disposed within the front frame of the vehicle 70, wherein the accelerometer 23 is configured to measure the acceleration of the vehicle 70. In the shown embodiment, the accelerometer 23 is operably connected to a display on a dashboard of the vehicle 70, such that the user can identify the acceleration of the vehicle 70.

A power switch 20 is disposed within the vehicle 70, wherein the power switch 20 is operably connected to both the first battery 11 and the second battery 12, as well as the electric motor 13, such that the power switch 20 controls which battery 11, 12 the electric motor 13 draws power from. Further, a charging switch 21 is operably connected to both the first battery 11 and the second battery 12, as well as the charging system 14, such that the charging switch 21 controls which battery 11, 12 the charging system 14 provides power to.

In the illustrated embodiment, a pair of power cords 73 are disposed within the front frame of the vehicle 70. Each power cord 73 is operably connected to one of the two batteries 11, 12. Each power cord 73 is stored within the front frame via a spool, such that the power cords 73 conserve space within the vehicle 70. Additionally, each power cord 73 include a male charging outlet disposed on a first end, wherein the first end of each power cord 73 is accessible to a user from outside the vehicle 70. In this way, the user is able to use the pair of power cords 73 to fully charge the first battery 11 and the second battery 12, should either battery drop below a specified charge such that the charging system 14 would be overtaxed if use were attempted. Additionally, as the first battery 11 has a power cord 73 separate from the second battery 12, the user is able to selectively determine which battery 11, 12 they desire to charge. In this way, the user does not need to wait for the first battery 11 to finish charging before recharging the second battery 12, or vice versa. Allowing both the first battery 11 and the second battery 12 to charge simultaneously via a wall outlet through the power cords 73 decreases the total wait time for a user when waiting for their vehicle 70 to finish recharging.

Figure 1B:
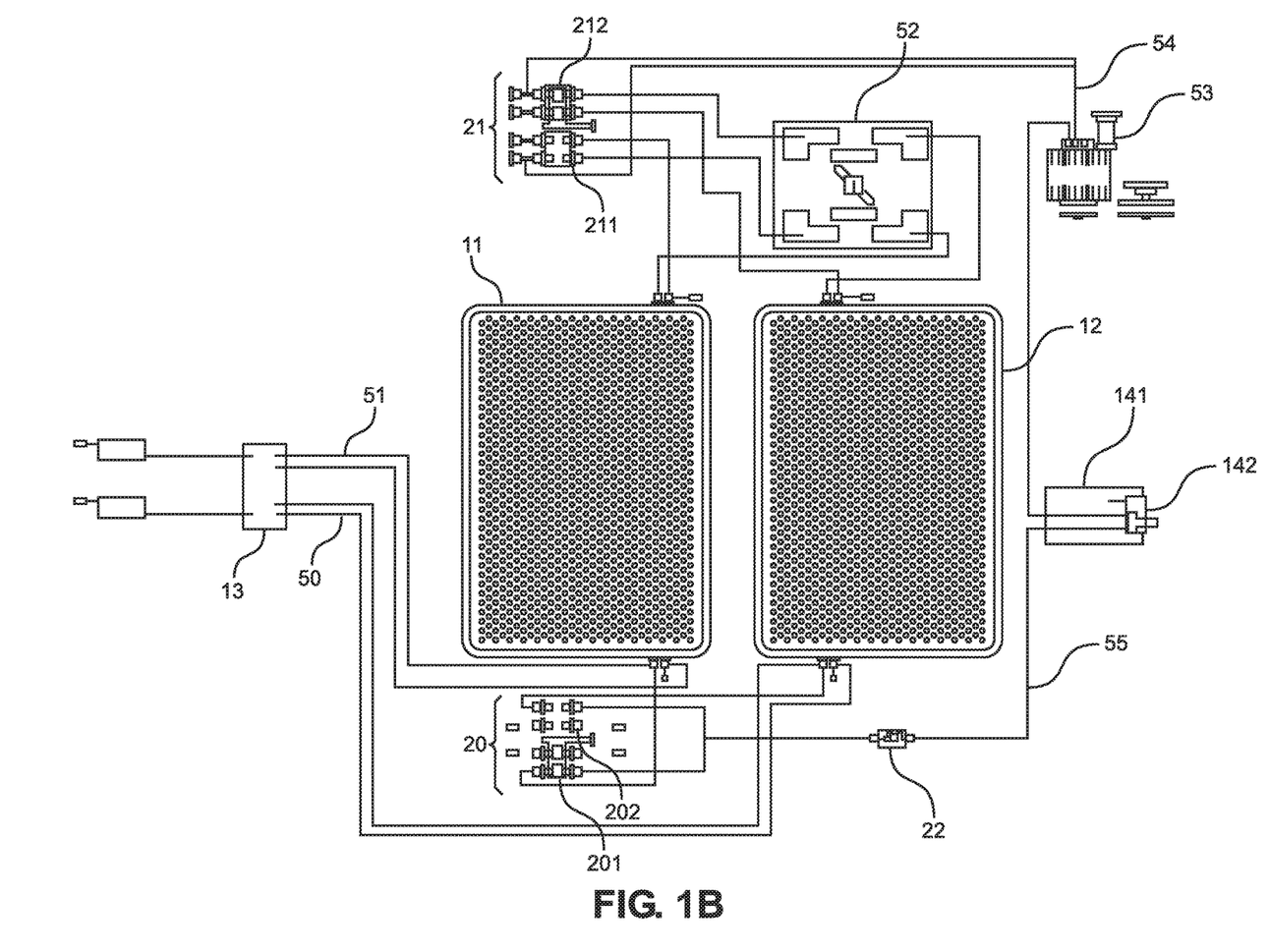
FIG. 1B shows a schematic of an embodiment of the interior components of the dual battery electric vehicle charging system.

Referring now to FIG. 1B, there is shown a schematic view of an embodiment of the interior components of the dual battery electric vehicle charging system. The power switch 20 includes a first internal power switch 201 and a second internal power switch 202, wherein the first internal power switch 201 connects the power switch 20 to the first battery 11, and the second internal power switch 202 connects the power switch 20 to the second battery 12. When the power switch 20 is actuated to the first battery 11, the circuit for the first internal power switch 201 is closed, thereby completing the circuit to the electric motor 13, as illustrated in the embodiment. Similarly, when the power switch 20 is actuated to the second battery 12, the circuit for the second internal power switch 202 is closed, the circuit to the electric motor 13 is completed and the second battery 12 provides power thereto. In the illustrated embodiment, the first battery 11 is operably connected to the power cables through a first pair of wires 51, whereas the second battery 12 is operably connected to the power cables through a second pair of wires 50. In this way, the user can continue to charge the first and second battery 11, 12 while the vehicle is not running but the power cables are operably connected to a power source.

Similar to the power switch 20, the charging switch 21 includes a first internal charging switch 211 operably connected to the first battery 11 and a second internal charging switch 212 operably connected to the second battery 12. Further, the charging switch 21 is operably connected to the charging system disposed within the vehicle via a feed wire 54. In the illustrated embodiment, the feed wire 54 is operably connected to a rectifier 53, wherein the rectifier 53 is configured to convert AC electricity produced by the charging system to DC electricity to charge the batteries 11, 12. The charging switch 21 is additionally operably connected to the ignition switch 52, such that the charging system is operated while the car is operated. Thus, when the vehicle is not actuated, the circuit of the ignition switch 52 is not closed, thereby preventing the batteries 11, 12 from attempting to draw power from the charging system.

In the shown embodiment, the charging system additionally comprises an alternator 141, having a binary functioning switch 142. The binary functioning switch 142 is a manual means of actuating the alternator 141, such that the user can manually turn the alternator 141 off should the neutral function associated with the charging switch 21 cease to function appropriately. In the illustrated embodiment, the alternator 141 is also operably connected to the voltage regulator 22 via an exciter wire 55. The exciter wire 55 is configured to convey the charge produced by the alternator 141 to the appropriate battery 11, 12. The voltage regular 22 is configured to read the power remaining within each battery 11, 12 and thereby determine which battery 11, 12 the charge produced by the charging system should be allocated to.

Figure 2:
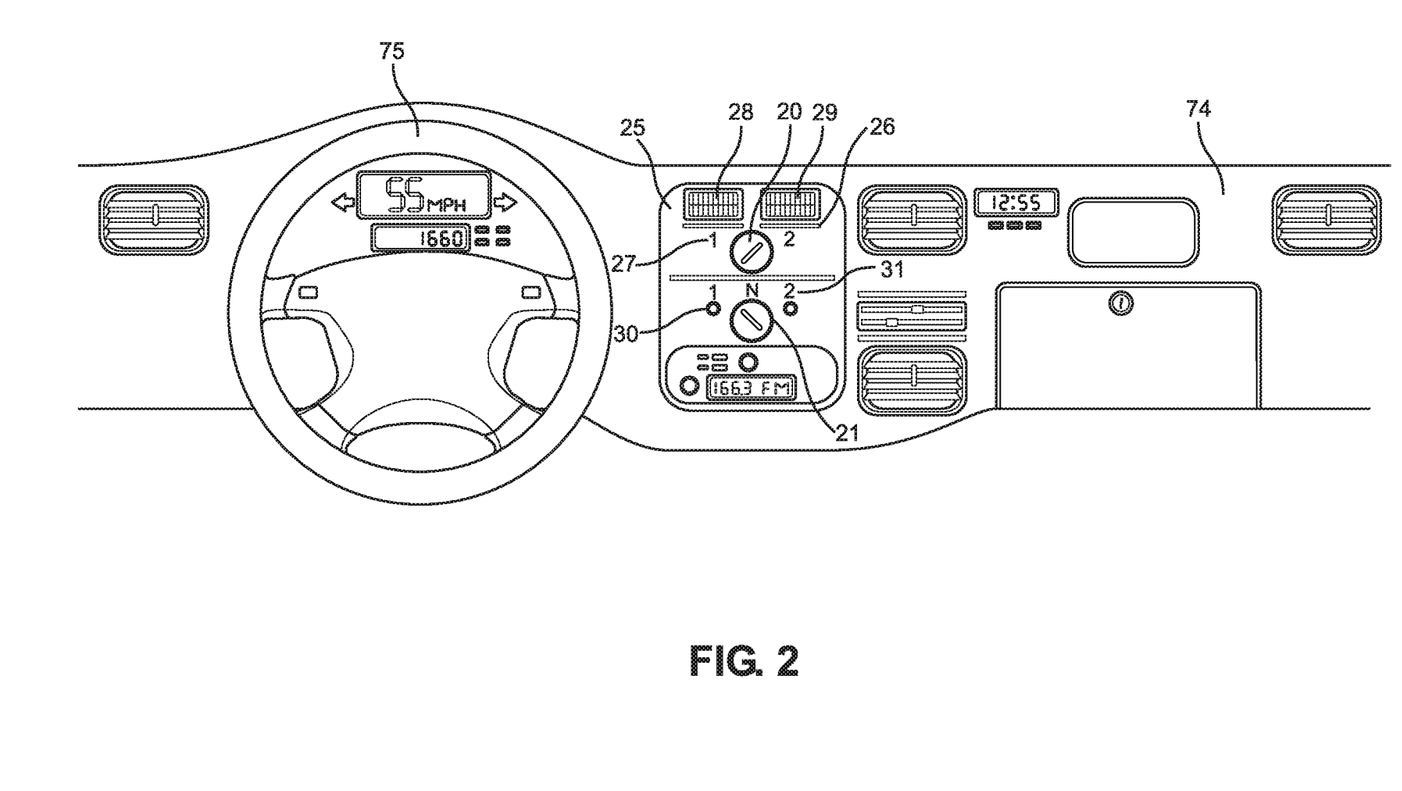
FIG. 2 shows a front view of an embodiment of the control panel of the dual battery electric vehicle charging system.

Referring now to FIG. 2, there is shown a front view of an embodiment of the control panel of the dual battery electric vehicle charging system. The dual battery electric vehicle charging system additionally comprises a control panel 25. In the illustrated embodiment, the control panel 25 is disposed within the dashboard 74 of the vehicle, such that an outer face of the control panel 25 is flush with the dashboard 74. In the shown embodiment, the control panel 25 is disposed proximate to a steering wheel 75 of the vehicle. In this way, the control panel 25 is within reach of the user while driving, thereby preventing the user from becoming distracted while operating the vehicle.

A first indicator 28 is disposed on the control panel 25. The first indicator 28 is operably connected to the first battery, such that the first indicator 28 displays the total power in the first battery, wherein a lighted color shown on the first indicator 28 corresponds to the amount of energy remaining in the first battery. Similarly, a second indicator 29 is additionally disposed on the control panel 25, wherein the second indicator 29 is operably connected to the second battery. The second indicator 29 displays the total power in the second battery, wherein a lighted color shown on the second indicator 29 corresponds to the amount of energy remaining in the second battery. In this way, the user can see the remaining charge in either battery by examining the first indicator 28 and the second indicator 29.

In the illustrated embodiment, the power switch 20 is disposed proximate to the first indicator 28 and the second indicator 29. A pair of charging indicia 27 is disposed on the control panel 25 beneath a binary gauge 26, wherein the charging indicia 27 indicates which battery is selected using the power switch 20. The binary gauge 26 is disposed between the indicator and indicium, such that the binary gauge 26 provides an additional designation to the user as to which battery the power switch 20 is selecting. In this way, the user can utilize the power switch 20 to choose which battery should provide power to the vehicle while making use of the information provided on the control panel 25, i.e. the amount of charge remaining to each battery. Further, the user can rest assured they have selected their desired battery by relying on the information provided by the charging indicia 27 and binary gauge 26.

Additionally, the control panel 25 includes the charging switch 21, wherein the charging switch 21 determines which battery is charged using the charging system disposed within the vehicle. The charging switch 21 can selectively determine which battery the charging system should provide power to. As such, the battery chosen is indicated by a pair of charging lights 30, wherein each charging light 30 corresponds to the respective battery chosen by the user to charge. Further, to aid the user in determining which battery corresponds to which charging light 30, a set of charging indicia 31 are disposed proximate to the charging lights 30. The charging indicia 31 includes an indicium for the first battery and an indicium for the second battery.

The charging switch 21 further includes an option to charge neither battery, thereby designated on the charging indicia 31 as a neutral option. In the illustrated embodiment, the neutral option on the charging indicia 31 is designated as "N". When the control panel 25 indicates the charge of one battery is below a set threshold, the charging system should no longer be used to attempt to recharge the specified battery. In this case, the user can utilize the charging switch 21 to select neither battery. Additionally, a user may choose to select neither battery on the charging switch 21 if both batteries are fully charged.

Figure 3A:
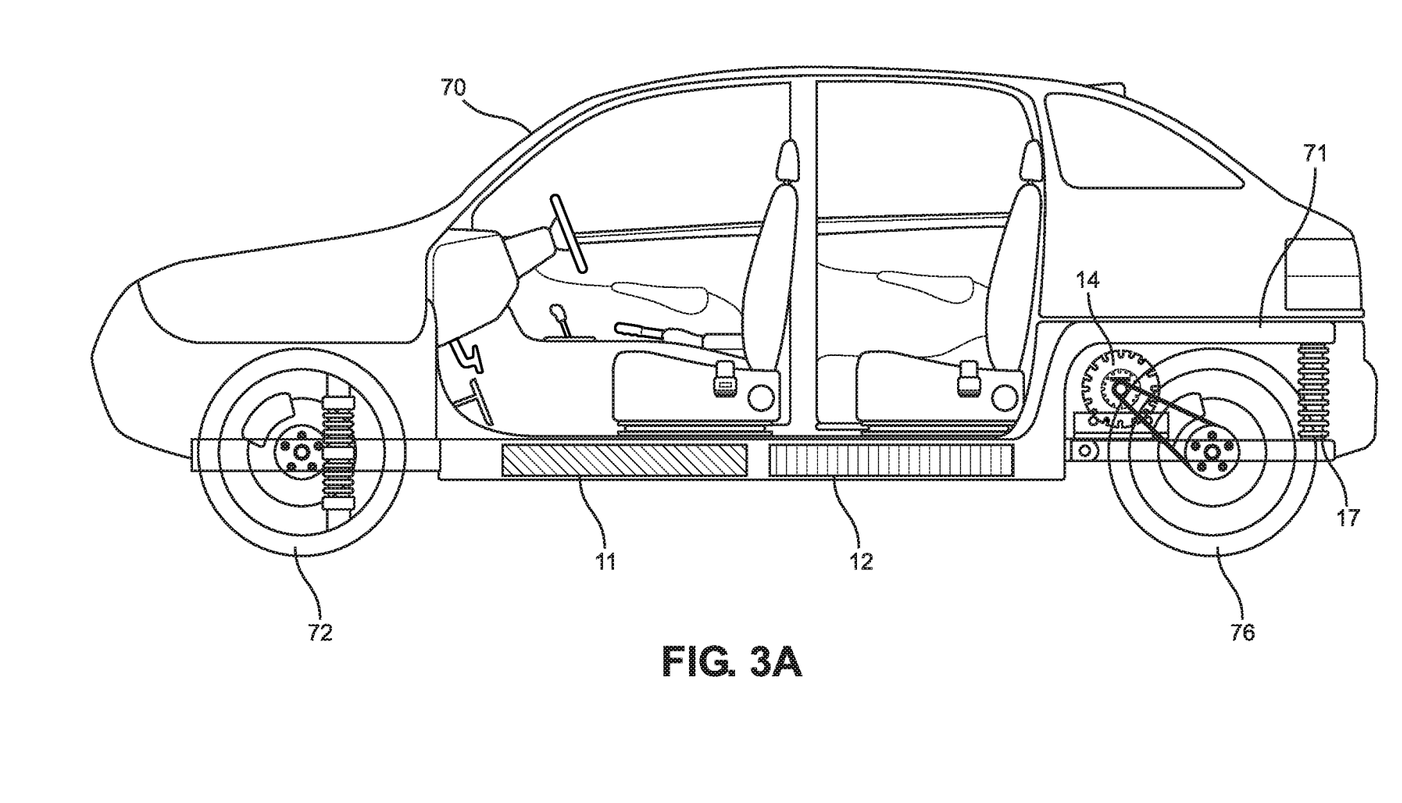
FIG. 3A shows a left side cross-sectional view of an embodiment of the dual battery electric vehicle charging system.
Figure 3B:
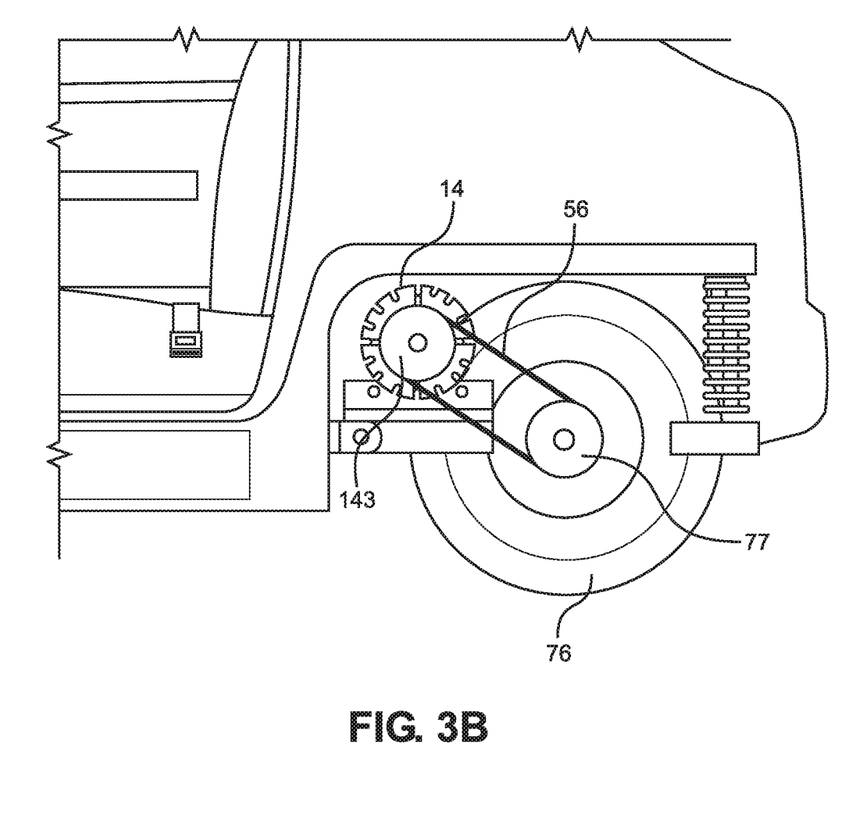
FIG. 3B shows a close-up left side cross-sectional view of an embodiment of the rear wheel of a vehicle.

Referring to FIGS. 3A and 3B, there is shown a close-up and a left side cross-sectional view of an embodiment of the dual battery electric vehicle charging system and a close-up view. In operation, a user will have a vehicle 70 with dual battery electric vehicle charging system, such that a first battery 11 and a second battery 12 are disposed within a frame 71 of the vehicle 70. The user will use a power switch to select which battery 11, 12 to use to power the vehicle 70, thereby providing power to the front wheels 72. While the vehicle 70 is moving, the user can use a charging switch to select which battery will receive power from a charging system 14, configured to produce a charge from the free rolling rear wheels 76, while a rear frame 17 prevents damage to the charging system 14 while the vehicle 70 is in motion. As illustrated in FIG. 3B, in one embodiment the charging system 14 has an alternator pulley 143 dimensioned to be equivalent in size to an axle pulley 77 of the rear wheels 76, wherein the two pulleys 143, 77 are linked to one another via a belt 56. The ratio between the alternator pulley 143 and the axle pulley 77 affects the efficiency of the charging system 14, wherein a smaller alternator pulley 143 results in a faster charge time. In this way, the user can utilize an electric vehicle over a greater distance than traditionally allowed.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dual battery electric vehicle charging system, comprising:
   a first battery disposed within a vehicle;
   a second battery disposed within the vehicle;
   wherein the first battery and the second battery are disposed within an interior of a center of a floorpan of a frame of the vehicle;
   wherein a pair of rear wheels on the vehicle are free rolling such that each rear wheel of the pair of rear wheels is operably connected to a non-powered independent rear axle;
   an electric motor operably connected to both the first battery and the second battery, wherein the electric motor is configured to power the vehicle;

at least an internal charging system operably connected to the first battery and the second battery;

a control panel disposed within the vehicle within reach of a driver;

a power switch disposed on the control panel operably connected to the electric motor, the first battery, and the second battery;

wherein the power switch is configured to selectively control which battery the electric motor draws power from;

a charging switch disposed on the control panel operably connected to the charging system, the first battery, and the second battery;

wherein the charging switch is configured to selectively control which battery draws power from the charging system;

wherein the charging switch further comprises a neutral option wherein neither battery is selected for charging.

2. The dual battery electric vehicle charging system of claim 1, wherein a pair of indicator lights are disposed on the control panel corresponding to the current battery providing power.

3. The dual battery electric vehicle charging system of claim 1, wherein the first battery and the second battery are each a solid-state battery.

4. The dual battery electric vehicle charging system of claim 1, wherein the first battery and the second battery are each operably connected to an independent power cable configured to provide a charge from an external power source.

5. The dual battery electric vehicle charging system of claim 1, wherein the charging system is operably connected to an axle of one of the rear wheels.

6. The dual battery electric vehicle charging system of claim 5, wherein the charging system comprises an alternator.

7. The dual battery electric vehicle charging system of claim 6, wherein the alternator is omni-directional.

8. The dual battery electric vehicle charging system of claim 5, wherein the rear suspension includes a pair of struts disposed around each rear wheel.

9. The dual battery electric vehicle charging system of claim 4, wherein each power cable is rotatably affixed to a spool disposed within the frame, wherein each power cable is stored in a spooled configuration when not in use.

10. The dual battery electric vehicle charging system of claim 1, wherein the control panel is disposed within a dashboard of the vehicle such that an outer face of the control panel is flush with the dashboard.

11. The dual battery electric vehicle charging system of claim 5, further comprising an air compressor operably connected to an axle of a second rear wheel of the pair of rear wheels.

12. The dual battery electric vehicle charging system of claim 11, wherein the air compressor is omni-directional, such that the air compressor operates when the second rear wheel rotates in either direction.

13. The dual battery electric vehicle charging system of claim 1, wherein a rear portion of the frame is affixed to the frame via a hinged stabilizer.

14. The dual battery electric vehicle charging system of claim 13, wherein the rear portion of the frame comprises a pair of sections, wherein each section of the pair of sections is associated with a rear wheel of a pair of rear wheels.

15. The dual battery electric vehicle charging system of claim 6, wherein the alternator further comprises a binary switch to manually actuate the alternate between an activated state and a deactivated state.

16. The dual battery electric vehicle charging system of claim 1, wherein a connection between the first and second batteries and the charging system is disconnected when the vehicle is not actuated independent of a position of the charging switch.

17. A dual battery electric vehicle charging system, comprising:

a first battery disposed within a vehicle;

a second battery disposed within the vehicle;

wherein the first battery and the second battery are disposed within an interior of a center of a floorpan of a frame of the vehicle;

wherein the first battery and the second battery are each operably connected to an independent power cable configured to provide a charge from an external power source;

wherein each power cable is rotatably affixed to a spool disposed within the frame, wherein each power cable is stored in a spooled configuration when not in use;

an electric motor operably connected to both the first battery and the second battery, wherein the electric motor is configured to power the vehicle;

at least an internal charging system operably connected to the first battery and the second battery;

a control panel disposed within the vehicle within reach of a driver;

a power switch disposed on the control panel operably connected to the electric motor, the first battery, and the second battery;

wherein the power switch is configured to selectively control which battery the electric motor draws power from;

a charging switch disposed on the control panel operably connected to the charging system, the first battery, and the second battery;

wherein the charging switch is configured to selectively control which battery draws power from the charging system;

wherein the charging switch further comprises a neutral option wherein neither battery is selected for charging.

18. A dual battery electric vehicle charging system, comprising:

a first battery disposed within a vehicle;

a second battery disposed within the vehicle;

wherein the first battery and the second battery are disposed within an interior of a center of a floorpan of a frame of the vehicle;

wherein a rear portion of the frame is affixed to the frame via a hinged stabilizer;

an electric motor operably connected to both the first battery and the second battery, wherein the electric motor is configured to power the vehicle;

at least an internal charging system operably connected to the first battery and the second battery;

a control panel disposed within the vehicle within reach of a driver;

a power switch disposed on the control panel operably connected to the electric motor, the first battery, and the second battery;

wherein the power switch is configured to selectively control which battery the electric motor draws power from;

a charging switch disposed on the control panel operably connected to the charging system, the first battery, and the second battery;

wherein the charging switch is configured to selectively control which battery draws power from the charging system;

wherein the charging switch further comprises a neutral option wherein neither battery is selected for charging.

* * * * *